US011669105B2

(12) United States Patent
Grubeck et al.

(10) Patent No.: US 11,669,105 B2
(45) Date of Patent: Jun. 6, 2023

(54) AUTONOMOUS MOBILE CLEANING ROBOT

(71) Applicant: Acconeer AB, Lund (SE)

(72) Inventors: Hans Grubeck, Tyresö (SE); Rikard Nelander, Lund (SE); Per Atlevi, Lund (SE); Mikael Egard, Lund (SE)

(73) Assignee: ACCONEER AB, Lund (SE)

( * ) Notice: Subject to any disclaimer, the term of this patent is extended or adjusted under 35 U.S.C. 154(b) by 118 days.

(21) Appl. No.: 16/958,839

(22) PCT Filed: Dec. 28, 2018

(86) PCT No.: PCT/EP2018/097113
§ 371 (c)(1),
(2) Date: Jun. 29, 2020

(87) PCT Pub. No.: WO2019/129869
PCT Pub. Date: Jul. 4, 2019

(65) Prior Publication Data
US 2021/0072766 A1 Mar. 11, 2021

(30) Foreign Application Priority Data
Dec. 29, 2017 (EP) ..................... 17211114

(51) Int. Cl.
G05D 1/02 (2020.01)
G01S 13/931 (2020.01)
(Continued)

(52) U.S. Cl.
CPC ............ *G05D 1/0257* (2013.01); *A47L 11/24* (2013.01); *A47L 11/4011* (2013.01);
(Continued)

(58) Field of Classification Search
CPC ......... G05D 1/0257; G05D 2201/0203; G05D 1/0268; A47L 11/24; A47L 11/4011;
(Continued)

(56) References Cited

U.S. PATENT DOCUMENTS

2008/0039974 A1  2/2008 Sandin
2013/0293408 A1  11/2013 Underwood
(Continued)

FOREIGN PATENT DOCUMENTS

CN  107432719 A  12/2017
CN  108731736 A  11/2018
(Continued)

OTHER PUBLICATIONS

KR-20150047899-A Translation (Year: 2015).*
(Continued)

*Primary Examiner* — Dale Moyer
(74) *Attorney, Agent, or Firm* — Shih IP Law Group, PLLC

(57) ABSTRACT

According to a first aspect of the present inventive concept there is provided an autonomous mobile cleaning robot, comprising: a radar sensor configured to scan a surface, during a movement of the robot along the surface, by transmitting radar signals towards the surface and acquiring, at different positions along said movement, radar responses from the surface, a radar signal processor configured to extract one or more features of each acquired radar response from the surface, and a controller configured to control an operation of the robot based on the extracted one or more features.

9 Claims, 4 Drawing Sheets

(51) Int. Cl.
  *A47L 11/24* (2006.01)
  *A47L 11/40* (2006.01)
  *B25J 11/00* (2006.01)
  *B25J 19/02* (2006.01)

(52) U.S. Cl.
  CPC ......... *B25J 11/0085* (2013.01); *B25J 19/027* (2013.01); *A47L 2201/04* (2013.01); *G05D 2201/0203* (2013.01)

(58) Field of Classification Search
  CPC . A47L 2201/04; B25J 11/0085; B25J 19/027; G01S 13/931
  See application file for complete search history.

(56) References Cited

U.S. PATENT DOCUMENTS

| | | | |
|---|---|---|---|
| 2014/0214205 A1* | 7/2014 | Kwon | A47L 9/2826 700/258 |
| 2014/0316634 A1 | 10/2014 | Biber | |
| 2015/0327742 A1 | 11/2015 | Strang | |
| 2015/0347871 A1 | 12/2015 | Sathyendra | |
| 2016/0097847 A1 | 4/2016 | Loesch | |
| 2016/0103451 A1* | 4/2016 | Vicenti | G05D 1/0242 700/259 |
| 2016/0274580 A1 | 9/2016 | Jung | |
| 2016/0313741 A1 | 10/2016 | Lindhe | |
| 2017/0176592 A1 | 6/2017 | Hoare | |
| 2020/0025868 A1 | 1/2020 | Trummer | |
| 2020/0142052 A1 | 5/2020 | Liu | |
| 2021/0121032 A1* | 4/2021 | Kim | A47L 9/2805 |

FOREIGN PATENT DOCUMENTS

| | | |
|---|---|---|
| DE | 102013202075 A1 | 8/2014 |
| DE | 102015003115 A1 | 9/2016 |
| DE | 102017210964 A1 | 1/2019 |
| EP | 2315051 A1 | 4/2011 |
| KR | 20150047899 A * | 5/2015 |
| WO | 8502266 A1 | 5/1985 |
| WO | 2008141131 A2 | 11/2008 |
| WO | 2012163403 A1 | 12/2012 |
| WO | 2015153109 A1 | 10/2015 |
| WO | 2018087365 A1 | 5/2018 |

OTHER PUBLICATIONS

N. Kees, et al "Road Surface Classification by using a Polarimetric Coherent Radar Module at Millimeter Waves", IEEE CAT No. 94CH3389-4 ISSN 0149-645X, 1994 IEEE MTT-S International Microwave Symposium Digest, vol. 3, May 23-27, 1994, pp. 1675-1678.
G. Magerl "Remote Sensing of Road Condition", CH2971-0/91/0000-213701, 1991 IEEE, pp. 2137-2140.
S. Hertl, "Contactless Determination of the Properties of Water Films on Roads", J. Phys E. Sci., Instrument 21 (1988) 955-958.
B. Yamauchi "Daredevil: Ultra-wideband Radar Sensing for Small UGVs", Proceedings Optical Diagnostics of Living Cells II, vo. 6561, Apr. 27, 2007, p. 65610B, 9 pages.
International Search Report from International Application No. PCT/EP2018/097113, dated Apr. 3, 2019.

* cited by examiner

AUTONOMOUS MOBILE CLEANING ROBOT

TECHNICAL FIELD

The present inventive concept relates to an autonomous mobile cleaning robot. The present inventive concept further relates to method for controlling an autonomous mobile cleaning robot.

BACKGROUND OF THE INVENTION

Autonomous mobile robots have become ubiquitous and find use in various applications. One popular type of autonomous mobile robots is autonomous mobile cleaning robots, such as vacuum cleaners, sweeping cleaners or the like. Autonomous mobile robots may typically employ various sensors for supporting navigation and control decisions. Cleaning robots may in addition employ sensors such as optical sensors or ultrasonic sensors for scanning and analyzing a floor surface. Thereby information regarding a floor surface may be taken into account when controlling the robot.

A drawback with existing optical and ultrasonic sensors is however that they may provide a lower reliability than desired, for instance due to being sensitive to noise, dust, color, ambient light and/or stray reflections from objects located peripheral in the detection zone.

SUMMARY OF THE INVENTIVE CONCEPT

An objective of the present inventive concept is to at least partially address the above stated issue. More specifically it is an object of the present inventive concept to enable an autonomous mobile cleaning robot being able to scan a floor surface in a more reliable manner.

According to a first aspect of the present inventive concept there is provided an autonomous mobile cleaning robot, comprising:

a radar sensor configured to scan a surface, during a movement of the robot along the surface, by transmitting radar signals towards the surface and acquiring, at different positions along said movement, radar responses from the surface, a radar signal processor configured to extract one or more features of each acquired radar response from the surface, and a controller configured to control an operation of the robot based on the extracted one or more features.

By the autonomous mobile cleaning robot (which in the following may be referred to as "the cleaning robot") including a radar sensor and radar signal processor, a more reliable monitoring and analysis of a surface is enabled. The surface may be a floor surface supporting the autonomous mobile cleaning robot.

By extracting at least one feature of each acquired radar response from the surface, a reliable monitoring is enabled as features of a plurality of acquired radar responses, each being acquired at a respective position along the movement, may be taken into account for the purpose of controlling the operation of the robot.

A radar sensor may be relatively insensitive to stray light and sound sources. A radar sensor may thus perform relatively consistently in various conditions, such as in environments where dust or other debris is prevalent. Radar signals can also penetrate materials which are non-transparent to optical wave lengths. The radar sensor may hence be positioned in a flexible manner on the mobile robot. The radar sensor may be arranged inside a body of the mobile robot. The radar sensor may thereby be protected from ambient conditions and collisions with external objects. This may also enable a more rational design and manufacturing process.

Features (or in other words characteristics) of radar responses may be sensitive to the reflective properties of a surface, as well as a distance thereto. A surface may accordingly be analyzed based on a one or more different features of acquired radar responses. Features of a radar response being sensitive include an amplitude of a radar response, a phase of a radar response, a spectral content of a radar response and/or a delay of a radar response.

A transmitted radar signal may be pulsed radar signals wherein a radar response may be acquired as a direct sample of a reflected radar signal. However, a radar response may also be acquired as a time-diluted sample of a reflected radar signal.

The radar signal processor may be configured to extract a spectral content of the radar responses acquired during the movement, wherein the controller may be configured to, in response to a change in spectral content between radar responses, output at least one of a control command adapted to cause the robot to change a movement or a control command adapted to cause the robot to change a cleaning mode. The spectral content of a radar response may be highly dependent on the type of reflecting surface. A spectral content is hence an advantageous feature to extract from acquired radar responses. Especially, by detecting a changed spectral content between radar responses (such as between a pair of consecutive acquired radar responses) a change of surface type may be detected during the course of movement of the cleaning robot, even in case no reference measurements have been made earlier.

According to one embodiment the radar signal processor is configured to extract an amplitude of each acquired radar response, wherein the controller may be configured to, in response to an oscillatory variation of the extracted amplitudes of radar responses acquired during at least a part of the movement, output at least one of a control command adapted to cause the robot to change a movement or a control command adapted to cause the robot to change a cleaning mode. As realized by the inventors, some surfaces, in particular surfaces with a liquid such as water thereon, result in a characteristic response namely that amplitudes of radar responses acquired while gradually approaching a liquid on a surface varies in an oscillatory manner. The present embodiment hence enables accurate detection of presence of a liquid on a surface. In case the radar sensor defines a detection lobe covering a surface portion in front of the robot, the presence of liquid may accordingly be detected prior to the robot entering the liquid.

The controller may be configured to output the control command on a condition that said oscillatory variation includes:

a first oscillatory variation, with a frequency within a first frequency band, of the extracted amplitudes of radar responses acquired during a first part of the movement, and a second oscillatory variation, with a frequency within a second frequency band being lower than the first frequency band, of the extracted amplitudes of radar responses acquired during a second part of the movement subsequent to the first part of the movement. This enables a detection of liquid with an improved reliability. As realized by the inventors, a frequency of the oscillatory variation of amplitudes need not be constant during approaching the liquid.

This may be attributed to a gradually increasing overlap between a detection lobe of the radar sensor and the liquid. As the overlap increases the contribution to a radar response originating from the liquid covered portion also increases. The frequency of the oscillation of amplitudes may accordingly be reduced during the second part of the movement, compared to the first part of the movement. The radar signal processor may alternatively or additionally be configured to determine the frequency band for detecting the oscillatory variation (or the first and the second frequency band for detecting the first and the second oscillatory variation, respectively) based on a reference scan of the surface by the radar sensor performed during a learning mode of the robot.

This enables taking into account that the characteristics of the oscillation caused by the presence of liquid may depend on the underlying surface type (such as a plastic, a wooden, a concrete or a tile floor surfaces). By performing a reference scan of the surface during a learning mode (e.g. after it has been verified that no liquid is present on the surface) the underlying surface type may be determined wherein an appropriate frequency range for detecting the oscillation may be determined. The determination of the frequency band may involve a calculation of the frequency band or a selection of a frequency band from a predetermined set of frequency bands.

The determination of the frequency band(s) may be based on only the reference scan, or in combination with the velocity of the robot as described above.

The controller may be configured to, in response to the oscillatory variation, determine that liquid is present on the surface and cause the robot to come to a standstill and/or to change a movement direction. Alternatively or additionally, the controller may control the robot to change a cleaning mode. Alternatively or additionally, the controller may control the robot to generate a detection signal. The presence of the liquid may hence be taken into account when controlling the robot. By controlling the movement of the robot, the risk for the cleaning robot moving into a liquid covered surface portion may thereby be reduced. Liquids such as water may be harmful to the mobile robot. In any case it may be undesirable to have the mobile robot entering a liquid covered surface portion as this may result in further spreading out of the liquid on the surface. By changing a cleaning mode cleaning operation may be modified or temporarily suspended while the robot maneuvers to avoid the liquid, or moves through the liquid. By generating a detection signal, a user of the robot may be alerted of the presence of liquid on the surface.

The radar signal processor may be configured to extract a delay of each radar response acquired during the movement (e.g. in relation to a reference time or a delay between transmission of a radar signal and the resulting radar response), wherein the controller may be configured to, in response to a changed delay (i.e. a change of a value extracted delays between radar responses), output at least one of a control command adapted to cause the robot to change a movement or a control command adapted to cause the robot to change a cleaning mode. Thereby, approach of a step or a landing or other feature resulting in a changed signal delay may be detected by the mobile robot.

The radar signal processor may be configured to extract a delay of each radar response acquired during the movement, wherein the controller may be configured to, in response to a value of an extracted delay being greater than a lower delay threshold and less than an upper delay threshold, determine that a radar signal transparent object, such as a carpet, is present on the surface and output a control command adapted to cause the robot to change a cleaning mode and/or a velocity. The lower delay threshold may for instance correspond to the delay when there is an increased separation between the radar sensor and the floor surface, in the range of approximately a few millimeters to a few centimeters, which may result if the robot is moving on a carpet. The delay threshold may alternatively correspond to an increased delay caused by the carpet causing an increased propagation delay.

The upper delay threshold (e.g. of one to a few centimeters) may for instance correspond to the increased delay when the robot approaches a step or landing rather, than entering a carpet.

Accordingly, the controller may be further configured to, in response to the value of the extracted delay being greater than the upper delay threshold, output a control command adapted to cause the robot to come to a standstill and/or change a movement direction. If the upper delay threshold (e.g. corresponding to a distance of one to a few centimeters) is exceeded a ledge (such as a step or landing) may be present in front of the mobile robot wherein the robot may be controlled to come to a standstill and/or change a movement direction. Hence the risk for the cleaning robot moving over a ledge may be reduced.

The radar sensor may be configured to define a detection lobe covering at least a surface portion underneath the robot. Alternatively, the radar sensor may be configured to define a detection lobe covering at least a surface portion in front of the robot. Alternatively, the radar sensor may be configured to define a detection lobe covering a surface portion underneath the robot and a surface portion in front of the robot. According to a second aspect of the present inventive concept, there is provided a method for controlling an autonomous mobile cleaning robot, the method comprising:

during a movement of the robot along the surface, transmitting radar signals towards the surface and acquiring, at different positions along said movement, radar responses from the surface, the method further comprising, for each acquired radar response from the surface, extracting one or more features of said acquired radar response, and controlling an operation of the robot based on the extracted one or more features.

The details and advantages discussed above in connection with the first aspect apply correspondingly to the second aspect.

The extracting of one or more features may comprise extracting an amplitude of said acquired radar response, and the method may further comprise, in response to detecting an oscillatory variation of the extracted amplitudes of radar responses acquired during at least a part of the movement (at different positions of the robot): causing the robot to change a movement and/or change a cleaning mode.

The oscillatory variation may be detected when the robot during the movement approaches a liquid present on the surface, wherein the robot may be caused to come to a standstill and/or to change a movement direction; and/or to change a cleaning mode.

The extracting of one or more features may comprise extracting an amplitude of the acquired radar response, and the method may further comprise, in response to detecting, during a first part of the movement, a first oscillatory variation, within a first frequency band, of the extracted amplitudes of radar responses acquired during the first part of the movement (at different positions of the robot), and detecting, during a second part of the movement, a second oscillatory variation, within a second frequency band, of the extracted amplitudes of radar responses acquired during the second part of the movement (at a different positions of the robot): causing the robot to change a movement and/or change a cleaning mode.

The first and second oscillatory variations may be detected sequentially when the robot during the movement approaches a liquid present on the surface, wherein the robot may be caused to come to a standstill and/or to change a movement direction; and/or to change a cleaning mode.

Although the above aspects may be particularly advantageous in the context of controlling an autonomous cleaning robot, the above aspects may however present a more general applicability to other types of robots moving about along a surface, such as a delivery robot, a lawn mower robot or some other utility robot.

Accordingly, in a further aspect there is provided an autonomous mobile robot, comprising:

a radar sensor configured to scan a surface, during a movement of the robot along the surface, by transmitting radar signals towards the surface and acquiring, at different positions along said movement, radar responses from the surface, a radar signal processor configured to extract one or more features of each acquired radar response from the surface, and a controller configured to control an operation of the robot based on the extracted one or more features.

The radar signal processor may be configured to extract an amplitude of each acquired radar response, wherein the controller may be configured to, in response to an oscillatory variation of the extracted amplitudes of radar responses acquired during at least a part of the movement, output a control command adapted to cause the robot to change a movement.

The controller may be configured to output the control command on a condition that said oscillatory variation includes:

a first oscillatory variation, with a frequency within a first frequency band, of the extracted amplitudes of radar responses acquired during a first part of the movement, and a second oscillatory variation, with a frequency within a second frequency band being lower than the first frequency band, of the extracted amplitudes of radar responses acquired during a second part of the movement subsequent to the first part of the movement.

According to yet a further aspect there is provided a method for controlling an autonomous mobile robot, the method comprising:

during a movement of the robot along the surface, transmitting radar signals towards the surface and acquiring, at different positions along said movement, radar responses from the surface, the method further comprising, for each acquired radar response from the surface, extracting one or more features of said acquired radar response, and controlling an operation of the robot based on the extracted one or more features.

The extracting of one or more features may comprise extracting an amplitude of said acquired radar response, and the method may further comprise, in response to detecting an oscillatory variation of the extracted amplitudes of radar responses acquired during at least a part of the movement (at different positions of the robot): causing the robot to change a movement and/or change a cleaning mode.

The extracting of one or more features may comprise extracting an amplitude of the acquired radar response, and the method may further comprise, in response to detecting, during a first part of the movement, a first oscillatory variation, within a first frequency band, of the extracted amplitudes of radar responses acquired during the first part of the movement (at different positions of the robot), and detecting, during a second part of the movement, a second oscillatory variation, within a second frequency band, of the extracted amplitudes of radar responses acquired during the second part of the movement (at different positions of the robot): causing the robot to change a movement and/or change a cleaning mode.

Any of the further embodiments and variations discussed in connection with the first aspect and the second aspect may be applied correspondingly to these two further aspects (where applicable with the exception of control commands being explicitly adapted to control a cleaning mode).

BRIEF DESCRIPTION OF THE DRAWINGS

The above, as well as additional objects, features and advantages of the present inventive concept, will be better understood through the following illustrative and non-limiting detailed description of preferred embodiments of the present inventive concept, with reference to the appended drawings. In the drawings like reference numerals will be used for like elements unless stated otherwise.

DETAILED DESCRIPTION OF PREFERRED EMBODIMENTS

Detailed embodiments of the present inventive concept will now be described with reference to the drawings.

Figure 1:
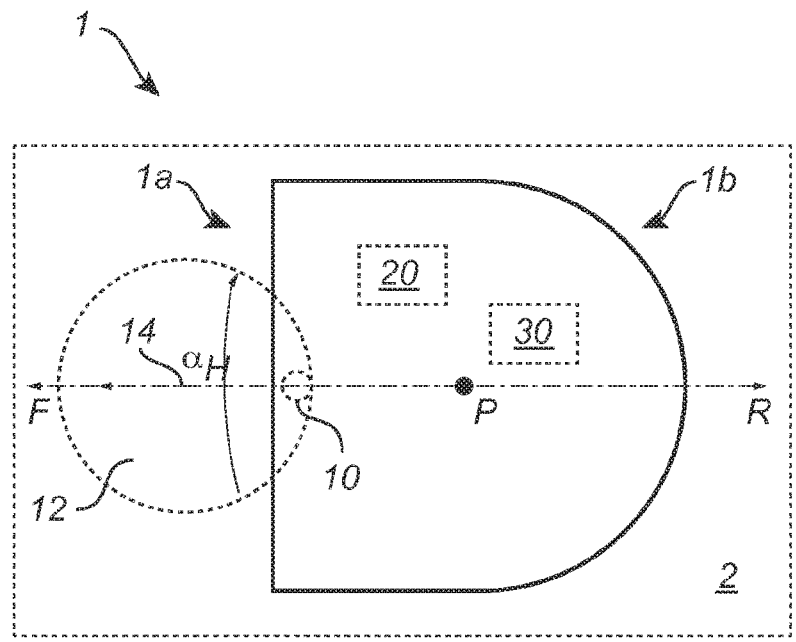
FIG. 1 is a schematic top view of an autonomous mobile cleaning robot.
Figure 2:
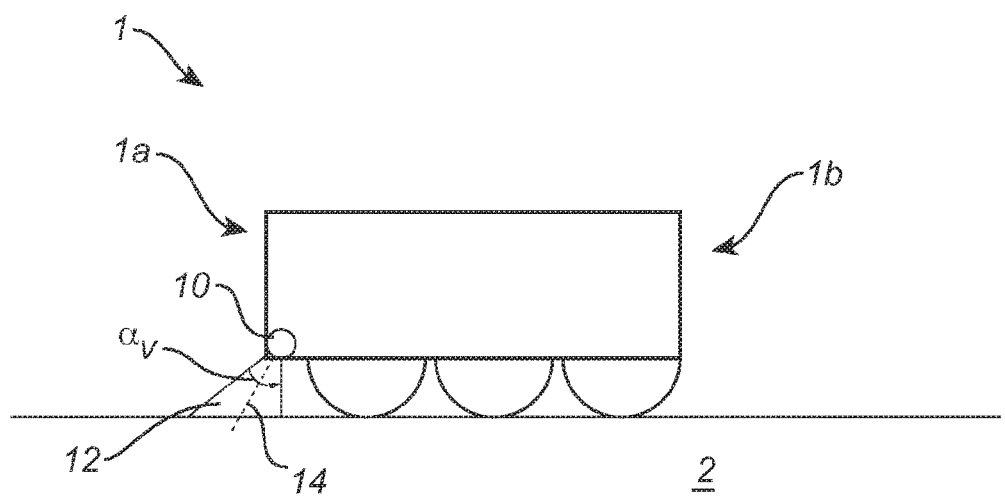
FIG. 2 is a schematic side view of the cleaning robot.

FIGS. 1 and 2 are top and side views, respectively, of an autonomous mobile robot 1 arranged on a surface 2, such as an indoor floor surface. The robot 1 may be for instance a vacuum cleaner robot, a sweeping cleaner robot or a wet cleaner robot and may accordingly include a corresponding cleaning sub-system for processing the surface 2. Depending on the type of cleaning robot, the cleaning sub-system may include a dry cleaning sub-system and/or a wet cleaning sub-system. A dry cleaning sub-system include one or more vacuum cleaning devices. A dry cleaning sub-system may include one or more sweeping devices such as roller brushes. A wet cleaning sub-system may include an applicator for a liquid cleaning agent for processing a floor surface 2. Cleaning sub-systems of cleaning robots are per se known and will not will therefore not be discussed in further detail herein.

The cleaning robot 1 comprises a body, the periphery of which is schematically indicated in FIGS. 1 and 2. The cleaning robot 1 has a front portion 1 *a*. The front portion 1 *a* refers to the portion of the cleaning robot 1 leading during a forward movement of the cleaning robot 1. The cleaning robot 1 further presents a rear portion 1 *b*, which is opposite to the front portion 1 *a*. It should be noted that the peripheral shape schematically indicated in FIGS. 1 and 2 is merely one example and other shapes are also possible. For instance, both the front and rear portions of the mobile robot may be rounded.

The cleaning robot 1 comprises a drive sub-system (not shown) configured to maneuver the cleaning robot 1 along the surface 2. The drive sub-system may include a wheeled drive sub-system including a number of wheel modules disposed underneath the cleaning robot 1 in such a manner that the cleaning robot 1 may move along the surface 2 in a forward direction F and a rearward direction R, as indicated in FIG. 1. The drive sub-system may further be configured to allow the cleaning robot 1 to change its direction, for instance by rotating in a clockwise and counterclockwise direction around vertical axis P extending through a substantially central portion of the body of the cleaning robot 1.

The cleaning robot 1 comprises a radar sensor 10. The radar sensor 10 is arranged on the cleaning robot 1. The radar sensor 10 is configured to scan the surface 2 while the cleaning robot 1 moves along the surface 2. The radar sensor 10 is configured to transmit radar signals towards the surface 2. The radar sensor 10 may be configured to transmit pulsed radar signals or wavelets towards the surface 2. The radar sensor 10 may include a transmitter configured to transmit (pulsed) radar signals. By pulse or wavelet is hereby meant an electro-magnetic oscillating signal having a carrier frequency and a limited temporal extension. Each pulse or wavelet may include one or more oscillations.

The radar sensor 10 is further configured to acquire a radar response from the surface 2. A radar response may include a reflected radar signal (e.g. a reflected radar pulses or wavelets) from the surface 2. The radar sensor 10 may include a receiver configured to receive radar signals.

The radar sensor 10 may include a transmitting antenna. The radar transmitter may be configured to transmit the radar pulses via the transmitting antenna. The radar sensor 10 may include a receiving antenna. The radar receiver may be configured to receive the reflected radar pulses via the receiving antenna. Alternatively, the radar sensor 10 may include a single antenna configured for both transmission and reception of signals. The antenna(s) may be of a directional type, for instance a dipole antenna, a Yagi antenna or a phased array antenna. Optionally, a reflector such as a horn reflector may be arranged in connection with the radar sensor to improve the directionality of the radar sensor.

Radar signals in the form of pulsed radar signals may be generated using various techniques. According to one example the radar sensor may include a transceiver module operating as a transmitter, as described in connection with FIG. 4 of the published PCT-application PCT/EP2011/058847 on page 11 lines 22-30.

The transceiver module comprises: a tank circuit, a variable differential conductance (VDC), preferably in the form of a resonant tunneling diode (RTD), coupled to the tank circuit, and a variable resistance coupled to the VDC and arranged to bias the VDC into a region of positive differential conductance during a first state of operation of the transceiver, and bias the VDC into a region of negative differential conductance during a second state of operation of the transceiver. During the transceivers first state of operation no output signal is generated and during the second state of operation a sinusoidal radio frequency signal is generated. Thus, by switching the transceiver from the first state to the second state and back to first state again, a pulse or wavelet signal may be generated where the duration of the wavelet corresponds to the time the transceiver is in its second state of operation. Compared with other methods of wavelet generation, this implementation offers a low-complexity method for generating wavelets with a well-defined start position and duration and a coherent phase content within the wavelet which enables a phase dependent system implementation and low power consumption due to the pulsed operation. This particular implementation may enable generation of wavelets of a duration between 10 ns and 50 ps in the mm-wave band, which gives a theoretical range resolution of 1.5 m to 7.5 mm, respectively. The wavelet generator described above may however also be implemented by using other oscillator configurations, for example, relying on negative differential conductance (e.g. provided by a cross-coupled differential pair) or positive feedback, where it is possible to start and quench the oscillations rapidly. Alternative implementations of wavelet generators include passing a continuous oscillation through a switchable amplifier, filtering of a baseband pulse, up-conversion of a baseband pulse, or using digital gates to create the desired waveform, as per se is known to the person skilled in the art.

The radar sensor 10 may be configured to acquire radar responses from the surface 2 resulting from transmitted radar signals. Analog or digital representations of acquired radar responses may be output to a radar signal processor 20 for further processing, as will be described in more detail below. The cleaning robot 1 may for instance include a communication interface, such as a data bus, via which the radar sensor 10 may communicate data to the radar signal processor 20.

Radar responses may be acquired using various techniques. A transmitted radar pulse may result in a reflected radar pulse from the surface 2. Reflected radar pulses may be acquired by directly sampling and digitizing each received radar pulse. Alternatively, to put less demands on the speed and accuracy of the acquisition and sampling circuitry, the radar sensor may include a sliding-correlator type of receiver enabling time-diluted sampling of reflected radar pulses from the surface 2. A burst of pulsed radar signal may be transmitted by the radar sensor, and a reflected corresponding signal burst may be received by the radar sensor. Each received reflected radar signal of the burst may be mixed with a respective pulsed reference signal generated by the radar sensor at a predetermined delay with respect to the transmitted radar pulse of the burst giving rise to the reflected radar pulse, which delay is varied throughout the burst. The mixing products may be processed and combined to determine or reconstruct an approximation of a received signal. The radar signal processor 20 may then further process each reconstructed received signal as set out below. A specific example of a wavelet transmitter-receiver system having a "sliding-correlator functionality" is disclosed on page 15 line 14 to page 25 line 23 in the published PCT-application PCT/EP2015/054678 in connection with FIGS. 1 and 2 thereof. An example operation of the system including mixing of received and reference signals is given on page 33 lines 13-34 with reference to FIGS. 6 and 7 of PCT/EP2015/054678. It should however be noted that also other implementations allowing coherent generation of transmitted and reference signals with a controllable phase relationship and correlation of received signals with the reference signals are possible.

As illustrated in FIGS. 1 and 2, the radar sensor 10 is configured to define a detection lobe 12 covering at least a surface portion in front of the robot and optionally also a surface portion underneath the robot. The detection lobe 12 is defined by the volume which is common to a main transmission lobe of the transmitter and a main reception lobe of the receiver. In other words, the detection lobe 12 corresponds to the region the radar sensor 10 covers. Although not shown, the detection lobe 12 may in practice have additional side lobes. The detection lobe 12 has a main direction or principal axis 14. FIGS. 1 and 2 shows the portion of the detection lobe corresponding to the half power beam width (FIPBW). With reference to FIG. 1, a horizontal azimuthal angle OH of the detection lobe 12 may be defined as the angle between the axes along which the detection lobe 12 presents the FIPBW. With reference to FIG. 1 and FIG. 2, a vertical elevation angle av of the detection lobe 12 may be defined as the angle between the axes along which the detection lobe 12 presents the FIPBW. The horizontal azimuthal angle OH may for instance be in the range of 30-100 degrees, such as about 50 degrees. The vertical elevation angle av may for instance be in the range of 30-100 degrees, such as about 80 degrees. The principal axis 14 may extend at an angle in the range of 60-100 degrees with respect to a main plane of the surface portion underneath the cleaning robot 1, preferably about 70 degrees.

The cleaning robot 1 comprises a radar signal processor 20. The radar signal processor 20 is configured to extract features or characteristics of radar responses from the surface 2. Although indicated as a being separated from the radar sensor 10, it is also possible that the radar signal processor 20 be co-located. The radar signal processor 20 may extract one or more of an amplitude of a radar response, a phase of a radar response, a spectral content of a radar response or a delay of a radar response.

The radar signal processor 20 may be configured to output an indication of the extracted features. The indication may include information regarding the extracted feature(s). The radar signal processor 20 may for instance output the indication as data representing the extracted feature(s) (e.g. data representing the amplitude, phase, spectral content and/or delay). The radar signal processor 20 may output the data to a controller 30 which, in response, may control the cleaning robot 10 as will be further described below. The radar signal processor 20 may communicate with the controller 30 via a communication interface, such as the aforementioned data bus.

The processing of the radar signal processor 20 may be implemented in dedicated circuitry, or in an application-specific integrated circuit (ASICs) or field-programmable gate arrays (FPGAs). The signal processor 20 may also include a microprocessor and a computer readable medium, such as a non-volatile memory, storing instructions implementing the processing operations of the radar signal processor 20.

The controller 30 of the robot 1 is configured to control an operation of the cleaning robot 1, based on or features of acquired radar responses from the surface 2, extracted by the radar signal processor 20. The controller 30 may output a control command to the appropriate sub-system of the cleaning robot 1. The controller 30 may output a control command to the drive sub-system of the cleaning robot 1 in case the movement of the cleaning robot 1 is to be controlled. The controller 30 may output a control command to the cleaning sub-system of the cleaning robot 1 in case a cleaning operation of the cleaning robot 1 is to be controlled. The controller 30 may communicate with the relevant sub-system via a communication interface, such as the aforementioned data bus.

The controller 30 may similar to the radar signal processor 20 be implemented in dedicated circuitry, an ASIC, an FPGAs or by a microprocessor and a computer readable medium storing instructions implementing the operations of the controller 30.

Although indicated as a being separated from the radar signal processor 20, the radar signal processor 20 and the controller 30 may be co located and represent different functional units implemented in different portions of a common circuit and/or by different software instructions being executed by a same microprocessor.

The operation of the cleaning robot 1 will now be described in connection with a number of scenarios.

Figure 3A:
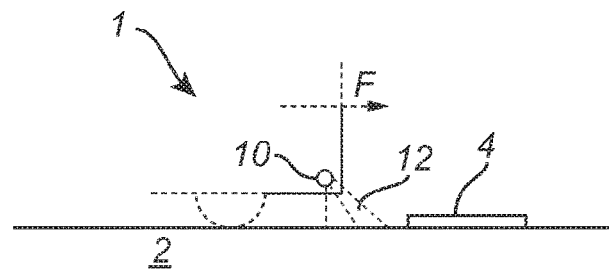
FIG. 3*a-c* illustrate the operation of the cleaning robot in one scenario.
Figure 3B:
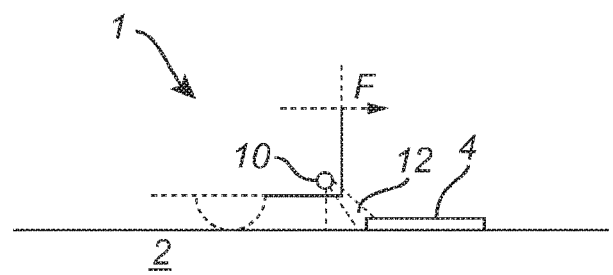
Figure 3C:
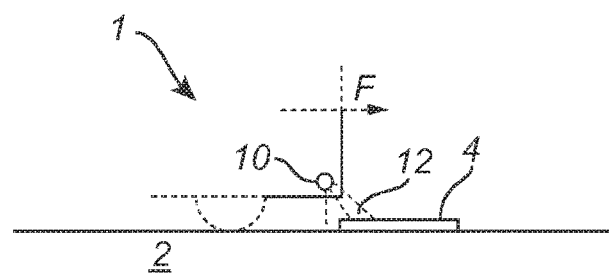

With reference to FIG. 3a-c, the cleaning robot 1 is driving in the forward direction F along the surface 2. The cleaning robot 1 may during the forward movement process the surface by operation of the cleaning sub-system. The surface 2 may be floor surface of any typical material, for instance wood, plastic, concrete or tiles. A portion of the surface 2 is coated with a liquid 4, such as water or some spilled beverage. As illustrated in FIGS. 3a-c, the cleaning robot 1 is gradually approaching the liquid surface 4.

During the forward movement, the radar sensor 10 repeatedly transmits radar signals towards the surface 2. The radar sensor 10 may be configured to transmit radar signals at a repetition frequency in the range of 10 Hz to 100 MHz, by way of example. The radar sensor 10 acquires radar responses from the surface (e.g. by receiving and sampling radar signals reflected by the surface 2 using any of the afore-mentioned techniques). Over time, the radar sensor 10 accordingly acquires a sequence of radar responses from the surface 2, each radar response of the sequence being acquired at a different position along the surface 2.

According to the present scenario, the signal processor 20 extracts at least an amplitude (such as a peak amplitude) of each acquired radar response from the surface 2. In case of a pulsed operation, the signal processor 20 may determine an amplitude of a received radar signal pulse at the delay corresponding to the distance to the surface 2. The signal processor 20 may by way of example determine an envelope of the received signal and determine the amplitude of the received signal as a maximum of the envelope. Some other equivalent measure indicative of an amplitude or magnitude of a radar response may alternatively be determined.

Figure 4:
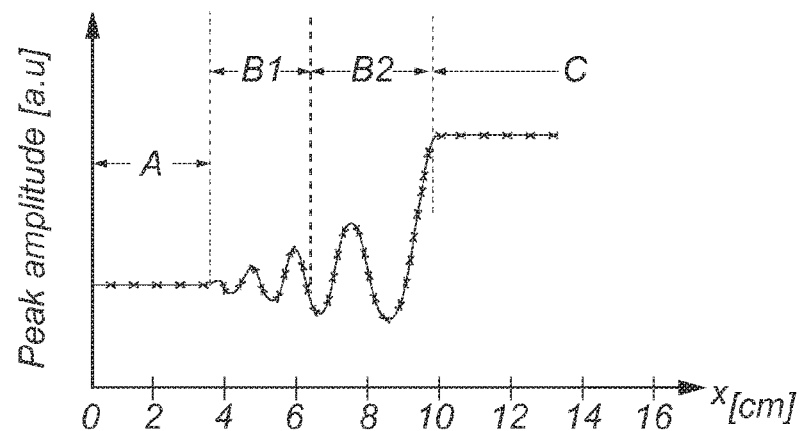
FIG. 4 illustrates an oscillation in a sequence of received radar signals.

FIG. 4 schematically illustrates extracted amplitudes as a function of a position x of the cleaning robot 1 along the surface 2. At the position of the cleaning robot 1 shown in FIG. 3a, corresponding to a position along a part A of the movement indicted in FIG. 4, the detection lobe 12 has not yet reached the liquid surface 4. The extracted amplitudes within the part A of the movement are therefore substantially uniform.

At the position of the cleaning robot 1 shown in FIG. 3b, the detection lobe 12 partially covers a portion of the liquid surface 4. As a result, the portion of the detection lobe 12 which is reflected by the liquid surface 4 will experience a different reflection than the portion of the detection lobe 12 not covering the liquid surface 4. A radar response when the cleaning robot is at the position shown in FIG. 3b will include signal contributions from both a non-liquid surface portion as well as from a liquid surface portion.

Accordingly, the amplitude of the radar response may, as has been realized by the inventors, change compared to the amplitudes of signals received in part A.

As the cleaning robot 1 continues the forward motion the portion of the detection lobe 12 covering the liquid surface 4 will gradually increase. At the position of the cleaning robot 1 shown in FIG. 3c, a major portion of the detection lobe 12 covers the liquid surface 4. As a gradually greater portion of the detection lobe 12 covers the liquid surface 4, the extracted amplitudes may, as has been realized by the inventors, oscillate as a function of the position x. This is visible in part B1 of FIG. 4. The oscillation may be considered as a characteristic indicator of presence of liquid 4 on the surface 2.

If the cleaning robot 1, subject to what is said below, is allowed to continue travelling towards the liquid surface 4 the oscillations may tend to decrease in frequency, as is visible in part B2 of FIG. 4.

Eventually the entire detection lobe 12 may eventually overlap the liquid surface 4 wherein the extracted amplitudes may approach a constant level. This is visible in region C of FIG. 4.

The signal processor 20 may be configured to detect presence of an oscillatory variation of the extracted amplitudes over a sequence of acquired radar responses. In other words, an oscillatory variation of the extracted amplitudes as a function of position of the robot may be detected. The signal processor 20 may output information regarding the presence of a detected oscillatory variation to the controller 30. Alternatively, the controller 30 rather than the signal processor 20 may detect the presence of the oscillatory variation. The signal processor 20 may for instance perform a frequency analysis, such as a fast Fourier transform (FFT), of a sequence of acquired amplitudes. An oscillation may then be detected for instance by detecting a non-zero or above-threshold amplitude in a (non-zero) frequency band where the oscillation is expected to occur. An alternative technique for detecting the oscillatory variation is detection by employing a matched filter.

The controller 30 may be configured to, in response to an oscillatory variation from the signal processor 20, determine that liquid 4 is present on the surface 2 and output a control command. The control command may be a movement control command. The controller 30 may for instance control the cleaning robot 1 to come to a standstill and/or change the movement direction in such a way that the liquid 4 may be avoided. The cleaning robot 1 may for instance be controlled to reverse its movement direction to move away from the liquid 4. Alternatively or additionally, the controller 30 may generate a control command for providing a detection signal indicative of the detection of liquid. The control command may for instance control a sound generator provided on the robot 1 to generate an audible alarm signal. The control command may also cause wireless transmission of a data message to a host, allowing logging of the detection. Alternatively or additionally, the control command may be a cleaning mode control command, changing a cleaning mode of the cleaning robot 1. For instance, a cleaning operation may be temporarily suspended such that the cleaning robot 1 may travel through the liquid 4 with brushes or vacuum functions deactivated.

The controller 30 may be configured to output any of the above-mentioned control commands in response to an oscillatory variation over a distance of a few millimeters to a couple of centimeters (e.g. corresponding to part B1 and/or B2 in FIG. 4). In that case, the movement of the robot 1 may be changed before reaching part C in FIG. 4, i.e. before entering the liquid.

Alternatively, the controller 30 may be configured to the control command(s) in response to a first oscillatory variation, with a frequency within a first frequency band, during a first part of the movement (e.g. corresponding to part B1 in FIG. 4), followed by a second oscillatory variation, with a frequency within a second frequency band being lower than the first frequency band, a second part consecutive part of the movement (e.g. corresponding to part B2 in FIG. 4). Each of the first and the second part may correspond to a distance of a few millimeters to a couple of centimeters.

Accordingly, the controller 1 may output the control command(s) only on a condition that the first oscillatory variation is detected during the first part of the movement and the lower frequency second oscillatory variation is detected during the second part of the movement. If the detection occurs only during the first part but not the second part the detection during the first part may be assumed to be a false indicator of liquid. Consequently, no changed control of the robot 1 is required. It may be noted that this approach may be extended to further parts, e.g. detection of a third oscillatory variation, with a frequency within a third frequency band, during a third part of the movement, subsequent to the second part etc. This may further improve the reliability of the detection of liquid. By way of example, for a cleaning robot moving along the surface with a velocity typical for cleaning robots, with a radar sensor 10 arranged at a distance of about 1 to 15 cm above the surface 2 and transmitting radar signals with a carrier frequency of about 60 GHz, the frequency of the oscillatory variation when approaching water may be in the range of 0.1-4 periods of oscillations per centimeter traversed by the robot 1. As noted above, the frequency may during a first part of a movement towards a liquid (e.g. part B1) may be greater than during a second part of the movement (e.g. part B2). Hence, for instance, the first frequency band for the first oscillatory variation may be 1-4 periods per centimeter while the second frequency band for the second oscillatory variation may be 0.1-1 periods per centimeter.

These frequencies are however only examples and the frequency band(s) may be different in case the radar sensor 10 for instance is arranged at a different distance above the surface 2, or in case another radar signal frequency is employed.

It should be noted that an oscillation pattern, similar to that occurring when approaching water, may result also when approaching other surfaces such as metal surfaces. The cleaning robot 1 may however as a safety precaution by default be configured to always come to a standstill in response to detection of the oscillation. Assuredly this may result in the cleaning robot 1 avoiding also non-liquid surfaces such as metallic surfaces. However, this may still be preferred over the cleaning robot 1 driving into liquid. Optionally, this may be a user-configurable option. Hence, if a user considers it certain that only metallic portions but no liquid patches exist in a room, the user may configure the robot to ignore detection of oscillations. For instance, the user setting may be accessed via a typical user interface accessible from an exterior of the body of the cleaning robot 1. To improve the accuracy of the detection of liquid, the frequency band for detecting the oscillation may additionally be based on a reference scan of the surface, performed during a learning mode of the robot.

During a learning mode, the cleaning robot 1 may move along the surface 2 along a pre-configured or random trajectory. During the movement the radar sensor 10 may scan the surface by transmitting radar signals towards the surface 2 and receiving reflected radar signals from the surface 2. The radar signal processor 20 may extract one or more of features of the acquired radar responses (at least as an amplitude), and store information about the extracted features as reference data.

By comparing the reference data to pre-stored reference data established for a set of pre-determined surface types (e.g. wood, plastic, concrete, plastic or tiles), the cleaning robot 1 may estimate the surface type as one of the predetermined surface types. The comparison may for instance involve calculation of a distance (using some suitable distance function) between the acquired reference data and the pre-stored reference data for each pre-determined surface type. The pre-determined surface type associated with the pre-stored reference data with the smallest distance to the acquired reference data may be selected as the surface type of the surface 2. Each one of the set of pre-determined surface types may further be associated with a respective pre-determined frequency band or set of frequency bands.

During subsequent operation of the cleaning robot 1, the radar signal processor 20 may monitor for oscillations within the pre-determined frequency band(s) associated with the surface type, as determined during the learning mode.

Figure 5A:
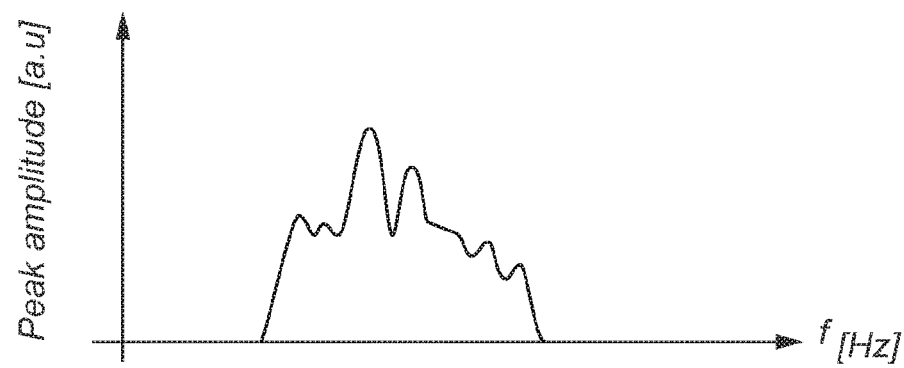
FIG. 5*a-b* illustrate two different spectrums of received radar signals.
Figure 5B:
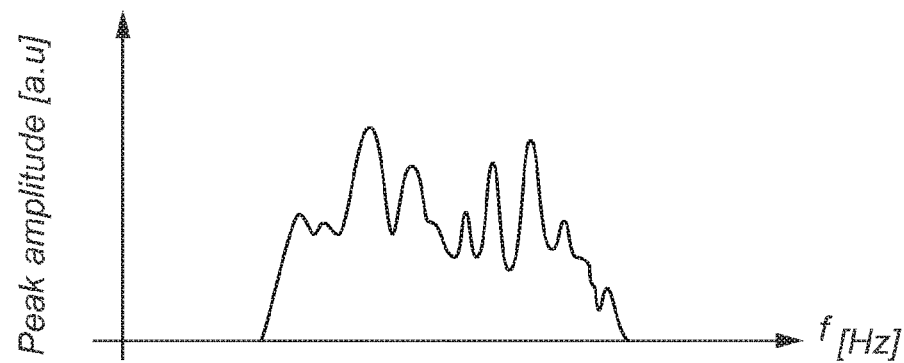

As an alternative to detecting a characteristic oscillation, the radar signal processor 20 may alternatively extract a spectral content of acquired radar responses, and detect a changed spectral content between consecutive acquired radar responses. For instance, in region A of FIG. 4, a spectral content of reflected signals may be given by FIG. 5a. Meanwhile, in region B or C of FIG. 4, a spectral content of reflected signals may be given by FIG. 5b. In response to detecting a changed spectral content the radar signal processor 20 may output an indication includes information regarding the changed spectral content to the controller 30. As the spectral content of a reflected signal may be highly dependent on the type of reflecting surface, a changed spectral content may serve as an indicator to the cleaning robot 1 that a different surface type is being approached. Establishing reference spectra (e.g. "fingerprints") of a number of different surface types, the cleaning robot 1 may estimate what type of surface is approaching and perform appropriate control of the cleaning robot 1.

Figure 6A:
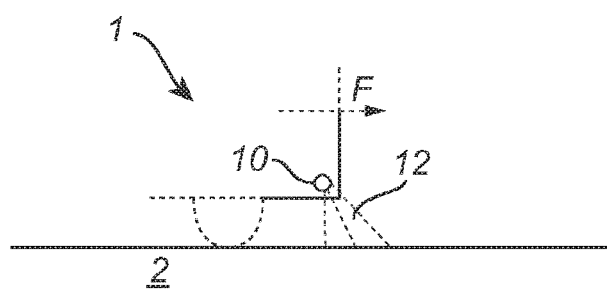
FIG. 6*a-b* illustrate the operation of the cleaning robot when approaching a radar transparent object on a surface.
Figure 6B:
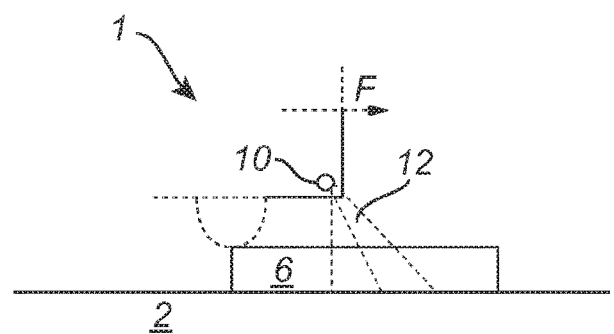

With reference to FIG. 6a-b, a further scenario is shown where the cleaning robot 1 is driving in the forward direction F along the surface 2. A portion of the surface 2 is covered with a radar signal semi-transparent object 6 in the form of a carpet, a blanket or some other textile. As described above, during the forward movement, the radar sensor 10 transmits radar signals and acquires radar responses from the surface 2.

According to the present scenario, the signal processor 20 extracts a delay of the acquired radar responses. The delay may be a round-trip delay of a radar pulse. That is, a delay between a transmitted radar signal and receipt of a reflected radar signal.

At the position of the cleaning robot 1 shown in FIG. 6a, the cleaning robot 1 has not yet entered the radar signal transparent object 6. This applies also to the detection lobe 12. At the position of the cleaning robot 1 shown in FIG. 6b, the cleaning robot 1 has maneuvered on top of the radar signal transparent object 6. The main reflection of the transmitted radar signals will however still occur at the surface 2 underneath the object 6. Accordingly, the delay of the received signals will be greater in FIG. 6b than in FIG. 6a.

The controller 30 may accordingly be configured to, in response to receiving information regarding the increased delay from the signal processor 20, determine that the cleaning robot 1 is on top of a radar signal transparent object 6 and output a control command. An increased delay may also be detected even before the robot 1 enters a radar signal transparent object 6 by detecting an increased propagation delay caused by the propagation of radar signals through the object 6. A radar signal transparent object 6, such as a carpet with a thickness of only a few millimeters, may cause an increased propagation delay being dependent on the material and thickness of the carpet, which may be detected with a sufficiently accurate radar sensor, such as the example system described in the above discussed application PCT/EP2015/054678.

The control command generated by the controller 30 may in any case be a cleaning mode control command, changing a cleaning mode of the cleaning robot 1. For instance, a cleaning operation may be controlled to increase the intensity at which the brushes or vacuum functions operate. Alternatively or additionally, the control command may be a movement control command. The controller 30 may for instance control the cleaning robot 1 to reduce or increase a velocity.

To allow distinction between radar signal transparent objects such as carpets and steps or landings, the controller 30 may be further configured to, in response to receiving information regarding a changed delay determine whether the delay is greater than a lower delay threshold and less than an upper delay threshold. The lower delay threshold may for instance correspond to a typical carpet thickness such as a few millimeters to a few centimeters. If the delay is greater than the lower threshold and less than the upper threshold the cleaning robot 1 may determine that it is on top of a radar signal transparent object 6 as set out above. If the delay is greater than the upper delay threshold, the cleaning robot may determine that a step or a landing is approaching and output a movement control command for controlling the cleaning robot 1 to come to a stand still and/or change a movement direction so that the step or landing may be avoided.

Detection of a changed delay may also be combined with the above-mentioned detection of an oscillatory variation wherein an additional criteria the controller 30 may evaluate to determine whether to output a control command may be if there in addition to the oscillatory variation is a changed delay (i.e. due to the elevated reflection surface provided by the liquid on the surface 2).

In the above the inventive concept has mainly been described with reference to a limited number of examples. However, as is readily appreciated by a person skilled in the art, other examples than the ones disclosed above are equally possible within the scope of the inventive concept, as defined by the appended claims.

For instance, the transmitter and receiver of the radar sensor 10 need not be co-located. Rather the transmitter and the receiver of a radar sensor may be arranged at different positions of the cleaning robot 10. This may reduce the risk for a transmitted radar pulse saturating the receiver of the radar sensor. This may in turn allow the transmitter and the receiver of the radar sensor to be positioned closer to the surface 2.

Moreover, although in the above the cleaning robot 10 includes a single radar sensor 10 a cleaning robot may also include further radar sensors. A greater portion of the surface 2 may thereby be monitored in parallel. Further, by configuring the detection zones of different radar sensors to at least partially overlap the signal to noise may improved by combining measurements from two or more radar sensors. The radar signal processor may accordingly be configured to perform data fusion of the output from the radar sensors. The radar signal processor may implement techniques, which per se are well-known, for fusing the data. Non-limiting examples of techniques include Simultaneous localization and mapping (SLAM), Kalman filtering and Extended Kalman filtering (EKF).

What is claimed is:

1. An autonomous mobile cleaning robot, comprising:
a radar sensor configured to scan a floor surface, during a movement of the robot along the floor surface, by transmitting radar signals towards the floor surface and acquiring, at different positions along the movement, radar responses from the floor surface,
a radar signal processor configured to extract one or more features of each of the radar responses, and
a controller configured to control an operation of the robot based on the extracted one or more features,
wherein the radar signal processor is configured to extract amplitudes of the radar responses, wherein the controller is configured to, in response to an oscillatory variation of the extracted amplitudes of the radar responses acquired during at least a part of the movement, output at least one of: a control command adapted to cause the robot to change a movement; or a control command adapted to cause the robot to change a cleaning mode,
wherein the controller is configured to output said control command on a condition that said oscillatory variation includes:
a first oscillatory variation, with a frequency within a first frequency band, of the extracted amplitudes of the radar responses acquired during a first part of the movement, and
a second oscillatory variation, with a frequency within a second frequency band being lower than the first frequency band, of the extracted amplitudes of the radar responses acquired during a second part of the movement subsequent to the first part of the movement.

2. The autonomous cleaning robot according to claim 1, wherein the radar signal processor is configured to determine the first and the second frequency bands based on a reference scan of the floor surface by the radar sensor performed during a learning mode of the robot.

3. The autonomous cleaning robot according to claim 1, wherein the controller is configured to, in response to said oscillatory variation, determine that liquid is present on the floor surface, wherein said control command is adapted to cause the robot: to come to a standstill and/or to change a movement direction and/or to change a cleaning mode.

4. The autonomous cleaning robot according to claim 1, wherein the radar signal processor is configured to extract delays of the radar responses, wherein the controller is configured to, in response to a change in the delay, output at least one of: a control command adapted to cause the robot to change a movement; or a control command adapted to cause the robot to change a cleaning mode.

5. The autonomous cleaning robot according to claim 4, wherein the controller is configured to, in response to values of the delays being greater than a lower delay threshold and less than an upper delay threshold, determine that a radar signal transparent object, such as a carpet, is present on the floor surface and output a control command adapted to cause the robot to change a cleaning mode or a velocity.

6. The autonomous cleaning robot according to claim 5, wherein the controller is configured to, in response to the values of the delays being greater than the upper delay threshold, output a control command adapted to cause the robot to come to a standstill and/or change a movement direction.

7. The autonomous cleaning robot according to claim 5, wherein the radar sensor is configured to define a detection lobe covering a floor surface portion underneath the robot and/or a floor surface portion in front of the robot.

8. A method for controlling an autonomous mobile cleaning robot, the method comprising:
during a movement of the robot along a floor surface, transmitting radar signals towards the floor surface and acquiring, at different positions along the movement, radar responses from the floor surface,
the method further comprising, for each of the radar responses, extracting one or more features of the radar responses, and
controlling an operation of the robot based on the extracted one or more features,
wherein the extracting of the one or more features comprises extracting amplitudes of the radar responses,
in response to detecting, during a first part of the movement, a first oscillatory variation, within a first frequency band, of the extracted amplitudes of the radar responses acquired during the first part of the movement, and detecting, during a second part of the movement, a second oscillatory variation, within a second frequency band, of the extracted amplitudes of the radar responses acquired during the second part of the movement, causing the robot to: change a movement; or change a cleaning mode, and
wherein the second frequency band is lower than the first frequency band.

9. The method according to claim 8, wherein said oscillatory variation or said first and second oscillatory variations is detected when the robot during said movement approaches a liquid present on the floor surface, wherein the robot is caused to come to a standstill and/or to change a movement direction and/or to change a cleaning mode.

* * * * *